UNITED STATES PATENT OFFICE.

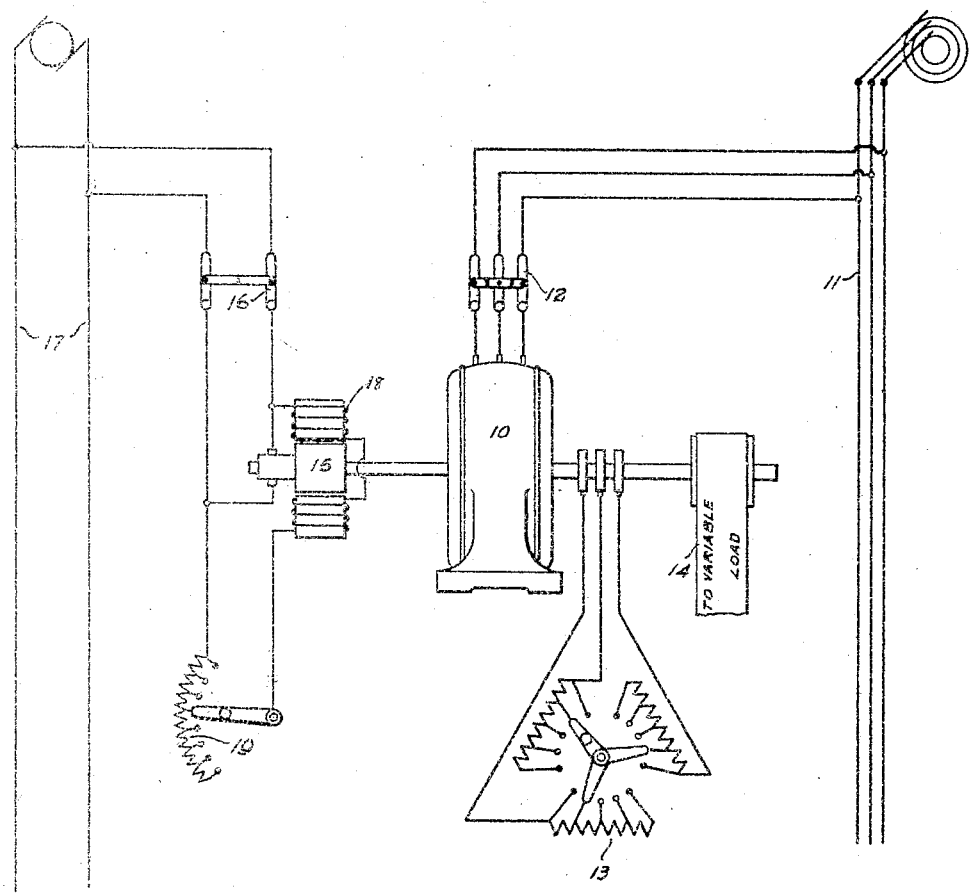

ERNEST A. WRIGHT, OF NORWOOD, OHIO, ASSIGNOR, BY MESNE ASSIGNMENTS, TO ALLIS-CHALMERS MANUFACTURING COMPANY, A CORPORATION OF DELAWARE.

MOTOR REGULATION.

1,174,373.

Specification of Letters Patent.

Patented Mar. 7, 1916.

Application filed August 23, 1911. Serial No. 645,518.

*To all whom it may concern:*

Be it known that I, ERNEST A. WRIGHT, a citizen of the United States, residing at Norwood, in the county of Hamilton and State of Ohio, have invented certain new and useful Improvements in Motor Regulation, of which the following is a full, clear, and exact specification.

My invention relates to motor regulation. When an induction motor is used to drive a variable load, there are pronounced changes in speed of the motor in inverse sense to the changes in the load.

It is the object of my invention to provide a system of regulation whereby an induction motor may drive a variable load at a substantially constant but adjustable speed.

In carrying out my invention a smaller direct current machine is mounted on the shaft of the induction motor or otherwise mechanically connected thereto. This direct current machine is connected to a direct current circuit, and has its field strength so adjusted that for a given load on the induction motor at any speed for which such motor is adjusted the direct current machine floats on the direct current circuit. Upon an increase or decrease in the load there is a slight slowing down or speeding up of the moving parts, and this causes the direct current machine to act as a motor or as a generator respectively to counteract the tendency to slow down or speed up.

The various novel features of my invention will appear from the description and drawing, and will be particularly pointed out in the claims.

The single figure of the drawing shows diagrammatically one embodiment of my invention.

The induction motor 10 has its primary winding connected to the alternating current circuit 11 through a switch 12. The motor 10 is of the wound rotor type, provided with a regulating resistance 13 in its secondary circuit. The motor 10 is mechanically connected, as by a belt 14, to a variable load of any description. The speed at which the motor 10 drives the load may be adjusted by the rheostat 13. It is desired that this speed, when once adjusted, should be maintained substantially constant.

On the shaft of the motor 10, or otherwise mechanically connected thereto, is a smaller direct current machine 15, the armature of which is connected, through a switch 16, across a direct current circuit 17 of substantially constant voltage. In the circuit of the field winding 18 of the direct current machine 15 is a rheostat 19.

With the switch 16 open, the rheostat 13 is properly adjusted to obtain the desired speed of the rotating parts for a given load on the belt 14; this given load will usually, though not necessarily, be the average load. Then the rheostat 19 is adjusted to make the voltage of the machine 15 substantially equal to that of the circuit 17. Upon closing the switch 16 the machine 15 now floats on the circuit 17, neither taking energy therefrom nor supplying energy thereto. Upon an increase in the load above the aforesaid given value, the moving parts slow down slightly, whereupon the machine 15 takes energy from the circuit 17 and acts as motor to assist the motor 10 to drive the variable load. Because of the assistance given by the motor 15, the change in speed is but a small part of what it would otherwise be. Should the load decrease below such given value, the moving parts speed up slightly and the machine 15 supplies energy to the circuit 17. This puts an increased load on the motor 10, and makes the speeding up consequent upon the diminution of the variable load but a fraction of what it would otherwise be. This action of the machine 15 as a motor or a generator according as the variable load transmitted through the belt 14 increases above or decreases below the given value, not only maintains the speed of the moving parts substantially constant, but also maintains the current taken by the motor 10 from the circuit 11 substantially constant.

In order to obtain a higher or lower substantially constant speed, the resistance of the rheostat 13 is decreased or increased respectively, and the resistance of the rheostat 19 is correspondingly decreased or increased respectively to make the voltage of the machine 15 substantially equal to that of the circuit 17 for the speed desired. Quite a wide range of speed is obtainable.

Various modifications may be made in the precise arrangement shown and described, and I aim to cover all such modifications which do not involve a departure from the spirit and scope of my invention as set forth in the following claims.

What I claim as new is:—

1. In combination, an induction motor driving a variable load, means for varying the resistance of the secondary circuit of said motor to cause said motor to operate at a plurality of normal speeds below synchronism, a direct current machine mechanically connected to said induction motor, a direct current circuit across which said direct current machine is connected, and means for varying the field excitation of said direct current machine to maintain the voltage thereof approximately equal to that of the direct current circuit when the induction motor is operating at any one of its normal speeds.

2. In combination, an induction motor driving a variable load, means for varying the resistance of the secondary circuit of said motor to enable said motor to drive the load at different speeds below synchronism, a direct current machine mechanically connected to said induction motor, a direct current circuit across which said direct current machine is connected, and means for varying the electromotive force of said direct current machine whereby the latter absorbs fluctuations in the load to main the speed of the motor substantially constant at any of said values below synchronism.

3. In combination, an induction motor of the wound rotor type driving a variable load, a variable resistance in the rotor circuit of said motor to enable said motor to run at different speeds, a direct current machine mechanically connected to said induction motor, a direct current circuit across which said direct current machine is connected, and means for varying the voltage of said direct current machine, said direct current machine operating as a generator when the load is below normal value and operating as a motor when the load is above normal value to maintain the speed of the induction motor substantially constant for a fixed amount of resistance in the rotor circuit.

4. In combination, a motor, a variable load driven thereby, means for enabling said motor to drive said load at a plurality of normal speeds, a direct current machine mechanically connected to said motor, a direct current circuit across which said direct current machine is connected, and means for varying the electromotive force of said direct current machine to render the said electromotive force approximately equal to that of said direct current circuit when said motor is operating at any one of its normal speeds.

5. In combination, a variable speed induction motor, a variable load driven by said motor, means for maintaining the speed of the motor at a substantially constant value below synchronous speed when once adjusted, said means comprising a direct current machine mechanically connected to the motor shaft, and means for varying the electromotive force of said direct current machine to render said machine effective to absorb fluctuations in the load on said motor for any predetermined speed of said motor.

6. In combination, a variable speed motor, a variable load driven by said motor, a dynamo-electric machine capable of acting as a generator or motor mechanically connected to said first motor, an electrical circuit across which terminals of said dynamo-electric machine are connected, and means operative to vary the electromotive force developed by said dynamo-electric machine due to its action as a generator to enable said machine to substantially absorb fluctuations in the load on said first motor when the latter is operating at any of its predetermined speeds.

Milwaukee, Wis., Aug. 8, 1911.

In testimony whereof I affix my signature, in the presence of two witnesses.

ERNEST A. WRIGHT.

Witnesses:
G. M. HIATT,
H. DETWILER.

---

It is hereby certified that in Letters Patent No. 1,174,373, granted March 7, 1916, upon the application of Ernest A. Wright, of Norwood, Ohio, for an improvement in "Motor Regulation," an error appears in the printed specification requiring correction as follows: Page 2, line 31, claim 2, for the word "main" read *maintain;* and that the said Letters Patent should be read with this correction therein that the same may conform to the record of the case in the Patent Office.

Signed and sealed this 28th day of March, A. D., 1916.

[SEAL.]

J. T. NEWTON,

*Acting Commissioner of Patents.*

Cl. 171-312.